No. 781,622. PATENTED JAN. 31, 1905.
B. SAMUELS.
ELECTRIC MOTOR.
APPLICATION FILED MAY 31, 1904.

2 SHEETS—SHEET 1.

Witnesses:
A. McArthur
Jessie Moore

Inventor:
Barney Samuels
By F. G. Fischer
atty

No. 781,622. PATENTED JAN. 31, 1905.
B. SAMUELS.
ELECTRIC MOTOR.
APPLICATION FILED MAY 31, 1904.

2 SHEETS—SHEET 2.

Witnesses:
J. McArthur
Jessie Moore

Inventor:
Barney Samuels.
By F. G. Fischer
Atty

No. 781,622.

Patented January 31, 1905.

UNITED STATES PATENT OFFICE.

BARNEY SAMUELS, OF LEAVENWORTH, KANSAS, ASSIGNOR OF ONE-HALF TO DAVID SAMUELS, OF LEAVENWORTH, KANSAS.

ELECTRIC MOTOR.

SPECIFICATION forming part of Letters Patent No. 781,622, dated January 31, 1905.

Application filed May 31, 1904. Serial No. 210,380.

*To all whom it may concern:*

Be it known that I, BARNEY SAMUELS, a citizen of the United States, residing at Leavenworth, in the county of Leavenworth and State of Kansas, have invented certain new and useful Improvements in Electric Motors, of which the following is a specification.

My invention relates to improvements in electric motors; and my object is to provide a motor of simple and durable construction which can be operated with less battery-power than is consumed by motors of the usual type.

While the invention is designed more especially as an improvement over motors having Z-armatures, it contains certain features that can be employed to advantage on motors of other types and also on relays.

The novel features of the invention reside more particularly in the construction of the poles of the magnetic field, the armature, and a circuit-breaker for cutting out a number of the battery-cells just prior to the armature contacting with the poles.

In order that the invention may be readily understood, reference will now be made to the accompanying drawings, in which—

Figure 1:
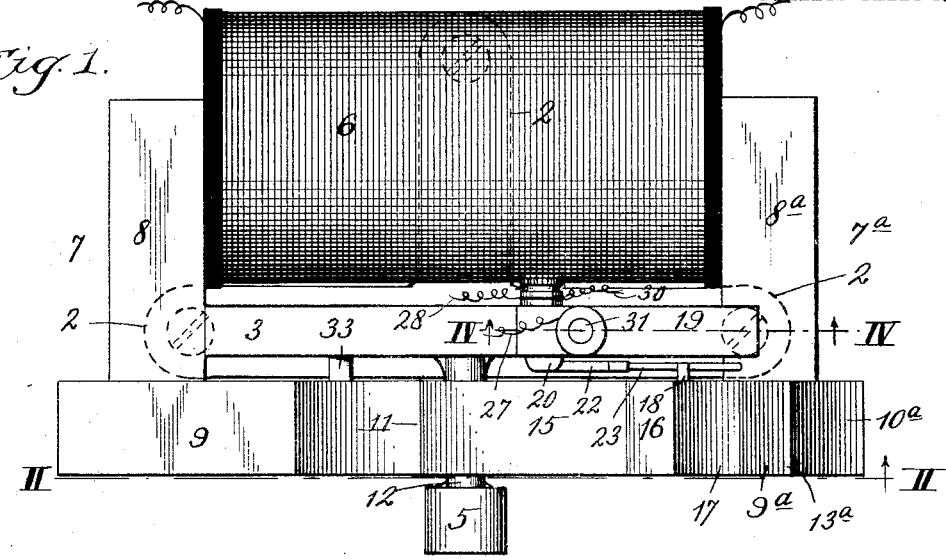
Figure 2:
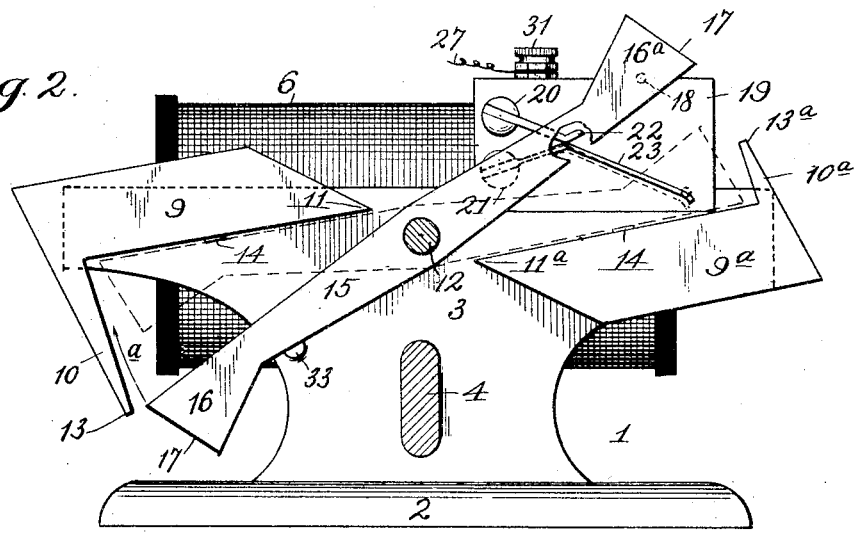
Figure 3:
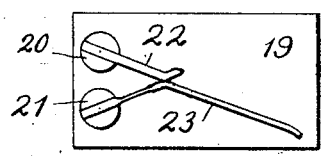
Figure 4:
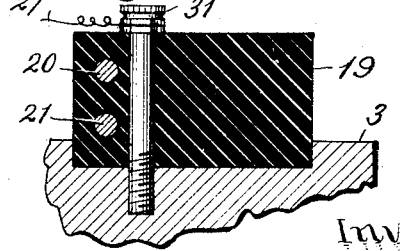
Figure 5:
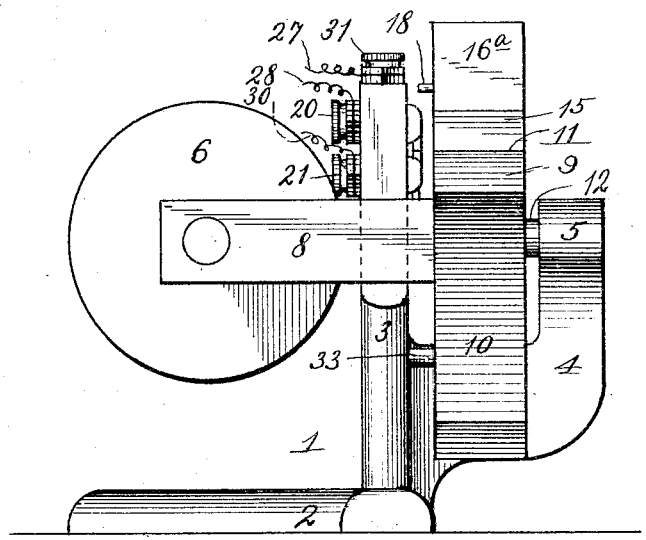
Figure 6:
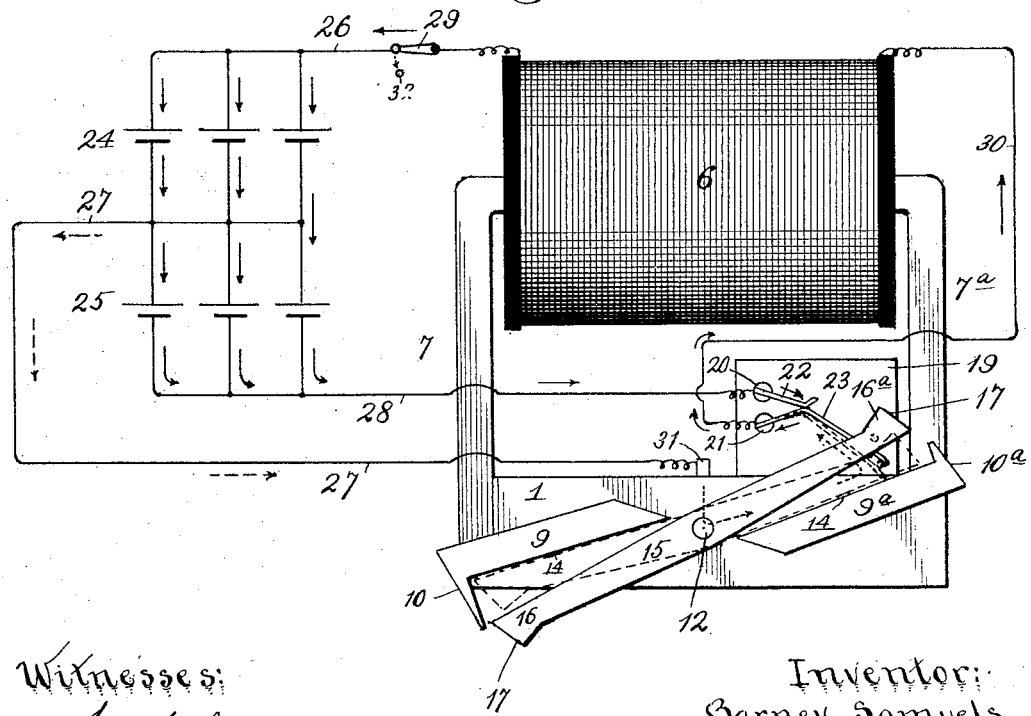

Figure 1 represents a plan view of a motor embodying my invention. Fig. 2 is a front elevation of the same, showing the operation of the armature and the circuit-breaker by dotted lines taken on line II II of Fig. 1. Fig. 3 is a detail front elevation of the circuit-breaker. Fig. 4 is a detail sectional view taken on line IV IV of Fig. 1, showing how one of the circuit-wires is connected to the frame of the motor. Fig. 5 is an end view of the motor, and Fig. 6 shows a diagram of the circuits.

In carrying out the invention I mount the motor upon a frame 1, comprising a triangular base 2, a vertical portion 3, and a curved arm 4, extending forwardly from vertical portion 3 and provided at its upper end with a bearing 5.

6 designates an electromagnet secured at its opposite ends to the rear ends of a pair of irregular-shaped poles 7 7$^a$, comprising parallel members 8 8$^a$, inclined parallel members 9 9$^a$, secured to the forward ends of members 8 8$^a$, and reversely-disposed members 10 10$^a$, secured to the outer ends of members 9 9$^a$, respectively. Inclined members 9 9$^a$ are arranged at right angles to members 8 8$^a$ and have beveled inner ends terminating in obtuse angles 11 11$^a$ near the opposite sides of a shaft 12, journaled in vertical portion 3 and bearing 5. Member 10 is longer than member 10$^a$ and both have reduced terminals 13 13$^a$ for a purpose hereinafter described. Said members extend at right angles to members 9 9$^a$, as shown in Fig. 2. The under side of member 9 and the upper side of member 9$^a$ have projecting stops 14.

15 designates an armature rigidly mounted at its central portion upon shaft 12. Said armature tapers toward its opposite end portions 16 16$^a$, which latter are enlarged and terminate in beveled edges 17. End portion 16$^a$ has a pin 18 extending inwardly toward vertical portion 3.

19 designates a rectangular piece of fiber or other insulating material secured on top of vertical portion 3 near one end of the latter and provided with a circuit-breaker comprising two binding-posts 20 21 and a contact-breaker comprising two members 22 23, secured at one end to said posts. Member 22 is composed, preferably, of stiff metal, while member 23 consists of spring metal, so it may be depressed out of contact with its companion by pin 18 when the armature is drawn into contact with stops 14. Contact member 23 is considerably longer than its companion in order that its free end may be readily depressed without materially retarding the armature when pin 18 contacts with and holds said member 23 out of contact with its companion.

In the diagram Fig. 6 the battery consists of two sets of cells 24 25, connected in series of three with circuit-wires 26 27 28. The current is controlled by a switch 29 in circuit with wire 26. When the switch is closed, the current flows from both sets of cells through wire 28, members 22 23 of the contact-breaker, wire 30, electromagnet 6, and back to the battery through wire 26. The current in passing through the electromagnet energizes the latter, so that the lines of force emanating therefrom will flow through members 8 and 9 of pole 7 and pass over to armature 15 from terminals 11 13, at which points the lines of force will concentrate, owing to the air-gap existing between the other portions of the pole and the armature. This concentration of the lines of force at terminals 11 13 will attract the armature and cause it to rotate in the direction of arrow $a$, Fig. 2, which movement brings its upper half close to terminals $11^a$ $13^a$ of pole $7^a$, so the lines of force will flow from the armature through said pole back to the electromagnet. As the armature approaches terminal $13^a$ the free passage of the lines of force from the former to the latter will accelerate the speed of the armature, and as the latter nears the broad surface of members 9 $9^a$ its speed is further increased by the strong attraction of the lines of force flowing through said members until it finally contacts with stops 14. After the armature has approached members 9 $9^a$ sufficiently close to permit uninterrupted flow of the lines of force through said members and the armature the lines of force will diminish in members 10 $10^a$ until they cease to bridge the air-gap between said members and the beveled ends 17 of the armature. Consequently the latter will not be retarded by the counteracting influence which the lines of force in members 10 $10^a$ would otherwise exert on the armature if its ends were square and paralleled said members. Pin 18 contacts with and depresses the resilient member 23 of the circuit-breaker out of contact with rigid member 22 just before the armature contacts with stops 14. The breaking of the contact between members 22 23 cuts out cells 25 of the battery, so the current from the latter will leave cells 24 and pass through wire 27, binding-post 31, frame 1, armature 15, pin 18, member 23, wire 30, electromagnet 6, and return to cells 24 through wire 26. While I have shown the cells of the battery connected in such a manner that but one-half their number will be cut out by the movement of the armature, I have found in practice that but one-third or less of the battery-power is required to hold the armature in contact with stops 14, because the broad opposing surfaces of the armature and members 9 $9^a$ afford a wide path for the free flow of the lines of force. Owing to the peculiar construction of the armature and members 9 $9^a$, it is possible to operate my motor with less consumption of battery-power than required in the operation of a motor containing the usual Z-armature, because in the latter construction the lines of force flow almost at right angles to the travel of the armature on account of the helical ends of the latter paralleling the concave poles of the magnet. In the present construction the armature is started by the attraction exerted thereon by the lines of force flowing through terminals 11 13, the armature, and terminal $11^a$. Then as the flat sides of the armature approach the broad surface of members 9 $9^a$ the lines of force will leave the narrow members 10 $10^a$ for the broader path presented by members 9 $9^a$. Consequently the lines of force will exert a pull on the armature almost in direct line with its movement. The circuit is broken by throwing switch 29 to pin 32, which demagnetizes the electromagnet and permits the armature to resume its normal position, Fig. 2. As end $16^a$ of the armature moves upwardly pin 18 is carried out of engagement with member 23 and permits it to spring up into contact with its companion 22.

In motors requiring but a limited movement of the armature members 10 $10^a$ may be dispensed with. These members will also be dispensed with when the motor is to act as a relay, and when employed in the latter capacity it of course will be provided with the customary circuit-breakers.

End 16 of the armature is made slightly heavier than end $16^a$, so it will swing down against stop 33 when the current is broken.

The circuit-breaker, comprising members 20, 21, 22, and 23, may be dispensed with on small motors requiring but little battery-power for their operation, as the saving in power obtained by cutting out one cell after the armature has contacted with stops 14 is hardly sufficient to warrant its use.

Having thus described my invention, what I claim, and desire to secure by Letters Patent, is—

1. A motor consisting of an electromagnet, poles secured to the opposite ends of said magnet terminating at their inner ends in obtuse angles, and an armature pivotally mounted between said poles.

2. A motor consisting of an electromagnet, poles secured to the opposite ends of said magnet terminating at their outer ends in right-angular reversely-disposed members, and an armature pivotally mounted between said poles.

3. A motor consisting of an electromagnet, poles secured thereto terminating at their inner ends in obtuse angles and at their outer ends in reversely-disposed right-angular members, and an armature pivotally mounted between said poles.

4. A motor consisting of an electromagnet, poles comprising a pair of parallel members secured to the opposite sides of the magnet, and a pair of inclined members arranged at right angles to the parallel members, and an armature pivotally mounted between the inclined members.

5. A motor consisting of an electric magnet, poles comprising a pair of parallel members secured to the opposite sides of the magnet, inclined members secured at right angles to the parallel members, and reversely-disposed members secured at right angles to the inclined members; and an armature pivotally mounted between the inclined members.

6. A motor consisting of an electric magnet, poles secured to said magnet, and an armature pivotally mounted between said poles and provided with enlarged terminals.

7. A motor consisting of an electric magnet, poles secured to the magnet provided with reversely-disposed right-angular members, and an armature pivotally mounted between the poles having beveled ends for forming an air-gap between the armature and the reversely-disposed members as the armature approaches the poles.

8. A motor consisting of an electric magnet, poles secured thereto, an armature pivotally mounted between said poles, and a circuit-breaker secured to the motor adjacent to the armature adapted to be operated by the latter.

9. A motor consisting of an electric magnet, poles secured thereto, an armature pivotally mounted between said poles, and a circuit-breaker secured to the motor consisting of two members one of which is arranged in the path of the motor.

10. A motor consisting of an electric magnet, poles secured thereto, an armature pivotally mounted between said poles, and a circuit-breaker secured to the motor consisting of two members one of which is resilient and arranged in the path of the motor.

11. A current-conducting circuit, a motor connected therein provided with an armature, and means in the circuit arranged in the path of the armature for cutting out a portion of the current.

12. A current-conducting circuit, a motor connected therein provided with a pivotally-mounted armature, and a circuit-breaker connected in the circuit consisting of two members one of which is arranged in the path of the armature so it will be separated from its companion on the operation of the armature.

13. A motor provided with an armature, a circuit-breaker having two members one of which is resilient and arranged in the path of the armature, a battery composed of two sets of cells, and circuit-conductors connecting the motor and circuit-breaker to the cells in such a manner that the combined force of the latter will be utilized in starting the armature after which one set of cells will be cut out by the separation of the members of the circuit-breaker.

14. A motor comprising a triangular base, poles secured thereto consisting of two parallel members, inclined parallel members secured to the first-mentioned ones, and reversely-disposed parallel members secured to the outer ends of the inclined members; an armature pivotally mounted between the inclined members, and a circuit-breaker arranged in the path of the armature.

In testimony whereof I affix my signature in the presence of two witnesses.

BARNEY SAMUELS.

Witnesses:
    PETER J. MONAGHAN,
    F. G. FISCHER.